United States Patent
Song et al.

(10) Patent No.: US 10,133,859 B2
(45) Date of Patent: Nov. 20, 2018

(54) MANAGING REGISTRATION OF USER IDENTITY USING HANDWRITING

(71) Applicant: Alibaba Group Holding Limited, George Town (KY)

(72) Inventors: Xuemei Song, Hangzhou (CN); Tao Fang, Hangzhou (CN)

(73) Assignee: Alibaba Group Holding Limited (KY)

( * ) Notice: Subject to any disclaimer, the term of this patent is extended or adjusted under 35 U.S.C. 154(b) by 107 days.

(21) Appl. No.: 14/841,192

(22) Filed: Aug. 31, 2015

(65) Prior Publication Data

US 2016/0063240 A1 Mar. 3, 2016

(30) Foreign Application Priority Data

Sep. 1, 2014 (CN) .......................... 2014 1 0440783

(51) Int. Cl.
*G06F 7/04* (2006.01)
*G06F 21/45* (2013.01)
*G06F 21/32* (2013.01)
*G06F 21/46* (2013.01)
*G06K 9/00* (2006.01)

(52) U.S. Cl.
CPC .............. *G06F 21/45* (2013.01); *G06F 21/32* (2013.01); *G06F 21/46* (2013.01); *G06K 9/00154* (2013.01); *G06K 9/00416* (2013.01); *G06K 2209/011* (2013.01)

(58) Field of Classification Search
CPC .......... G06F 21/45; G06F 21/46; G06F 21/32; G06K 9/00416; G06K 9/00154; G06K 2209/011
USPC .......................................................... 726/6
See application file for complete search history.

(56) References Cited

U.S. PATENT DOCUMENTS

| | | | |
|---|---|---|---|
| 5,151,950 A | 9/1992 | Hullender | |
| 5,267,327 A | 11/1993 | Hirayama | |
| 5,517,579 A | 5/1996 | Baron et al. | |
| 5,544,255 A | 8/1996 | Smithies | |
| 5,649,023 A | 7/1997 | Barbara et al. | |

(Continued)

FOREIGN PATENT DOCUMENTS

| | | |
|---|---|---|
| CN | 1445654 | 10/2003 |
| CN | 1445723 | 10/2003 |
| JP | 2001155162 | 6/2001 |

OTHER PUBLICATIONS

Kushida et al., "A Study on Objective Difficulty in Consideration of Safety of Signatures," Proceedings of the 2013 Engineering Sciences Society Conference of the Institute of Electronics, Information and Communication Engineers (IEICE), Japan, IEICE, Sep. 3, 2013, p. 54-55.

(Continued)

*Primary Examiner* — Mohammad W Reza
(74) *Attorney, Agent, or Firm* — Van Pelt, Yi & James LLP

(57) ABSTRACT

Embodiments of the present application relate to a method, apparatus, and system for registering a user identity. The method includes receiving handwriting information associated with handwriting entered by a user, computing a degree of complexity of the first handwriting information, and in the event that the degree of complexity of the first handwriting information satisfies one or more preset conditions, associating the first handwriting information with identity registration information corresponding to the user.

26 Claims, 8 Drawing Sheets

(56) References Cited

U.S. PATENT DOCUMENTS

| | | |
|---|---|---|
| 5,657,396 A | 8/1997 | Rudolph et al. |
| 5,754,686 A | 5/1998 | Harada et al. |
| 5,818,955 A | 10/1998 | Smithies |
| 5,828,783 A * | 10/1998 | Ishigaki ............. G06K 9/00436 382/186 |
| 6,307,956 B1 | 10/2001 | Black |
| 6,393,138 B1 | 5/2002 | Chai |
| 6,978,019 B1 | 12/2005 | Lapstun et al. |
| 7,116,804 B2 | 10/2006 | Murase et al. |
| 7,170,499 B1 | 1/2007 | Lapstun et al. |
| 7,197,167 B2 | 3/2007 | Chung et al. |
| 7,363,505 B2 | 4/2008 | Black |
| 7,973,775 B2 | 7/2011 | Lapstun et al. |
| 8,146,139 B2 | 3/2012 | Gaines et al. |
| 8,332,918 B2 | 12/2012 | Vedula |
| 9,235,748 B2 | 1/2016 | Mettyear |
| 9,307,028 B2 | 4/2016 | Rakan |
| 2003/0179912 A1 | 9/2003 | Murase et al. |
| 2003/0179913 A1* | 9/2003 | Murase ............... G06K 9/00154 382/119 |
| 2003/0182585 A1* | 9/2003 | Murase ................. G06F 21/32 726/3 |
| 2003/0233557 A1* | 12/2003 | Zimmerman ...... G06K 9/00154 713/186 |
| 2006/0230286 A1 | 10/2006 | Kitada |
| 2008/0005579 A1* | 1/2008 | Gaines .................. G06F 21/32 713/186 |
| 2008/0049986 A1* | 2/2008 | Arai ................... G06K 9/00187 382/119 |
| 2009/0150677 A1 | 6/2009 | Vedula |
| 2010/0104189 A1 | 4/2010 | Aravamudhan et al. |
| 2010/0329562 A1 | 12/2010 | Zhu |
| 2011/0161829 A1 | 6/2011 | Kristensen |
| 2012/0192250 A1* | 7/2012 | Rakan ................ G06F 3/03545 726/2 |

OTHER PUBLICATIONS

Matsuoka et al., "Security Technologies for Business Notebook PCs," Toshiba review, Japan, Toshiba Corporation, Aug. 1, 2005, vol. 60, No. 8, p. 23-26.

Muramatsu et al., "Online Signature Verification Using User Generic Fusion Model," IEICE Transactions, Japan, IEICE, Feb. 1, 2007, vol. J90-D, No. 2, p. 450-459.

Renaud et al. "Dynahand: Observation-resistant recognition-based web authentication." IEEE Technology and Society Magazine 26.2 (2007): 22-31.

* cited by examiner

MANAGING REGISTRATION OF USER IDENTITY USING HANDWRITING

CROSS REFERENCE TO OTHER APPLICATIONS

This application claims priority to People's Republic of China Patent Application No. 201410440783.5 entitled A METHOD AND DEVICE FOR REGISTERING IDENTITY, filed Sep. 1, 2104 which is incorporated herein by reference for all purposes.

FIELD OF THE INVENTION

The present application relates to identity verification. In particular, the present application relates to a method, system, and device for registering an identity using handwriting information.

BACKGROUND OF THE INVENTION

With the development of computer and internet technology, the dissemination and sharing of information has become increasingly convenient and quick, while at the same time giving rise to various information security problems. In order to safeguard information security, a variety of information security protection technologies have been developed in response to current needs. For example, identity verification technologies, encryption key protection technologies, and the like have been developed in relation to information security.

Identity verification is an important component in safeguarding system security. According to some conventional information security systems, network systems only publish and share a variety of network resources, system resources, and information resources securely and with high efficiency if identity is successfully verified.

Some related identity verification technologies include static password authentication technology, dynamic password authentication technology, biometric authentication technology, and authentication technology based on magnetic cards/smart cards, and the like. Of the authentication methods used by some related identity verification technologies, biometric authentication technology is a highly credible authentication method that is also difficult to falsify. As a result, biometric authenticating is currently becoming one of the simplest and most secure authentication technologies.

According to some related art, a biometric authentication technology includes collecting and recording handwriting that is manually entered by the user via a touch screen. When identity of a user is to be verified, handwriting that is manually entered by the user via a touch screen is compared to the recorded handwriting of the user, and based on the comparison between the entered handwriting and the recorded handwriting, verification of the user's identity can be realized.

In authentication methods in which identity verification is performed using collected handwriting that is manually entered by the user via a touch screen, if the collected handwriting is excessively simple, then the handwriting is very easily imitated, resulting in an inability to effectively verify user identity, and creating potential system security risks. Conversely, if the collected handwriting is overly complex, false non-matches can occur, resulting in the inability of the system to successfully verify user identity and potentially causing the user to repeatedly attempt to execute identity verification. Causing a genuine user to repeatedly attempt to execute identity verification consumes an excessive amount of system resources and can lead to unsatisfactory user experiences.

BRIEF DESCRIPTION OF THE DRAWINGS

Various embodiments of the invention are disclosed in the following detailed description and the accompanying drawings.

FIG. 2A illustrates information used in connection with registering an identity according to various embodiments of the present application.

DETAILED DESCRIPTION

Figure 1:
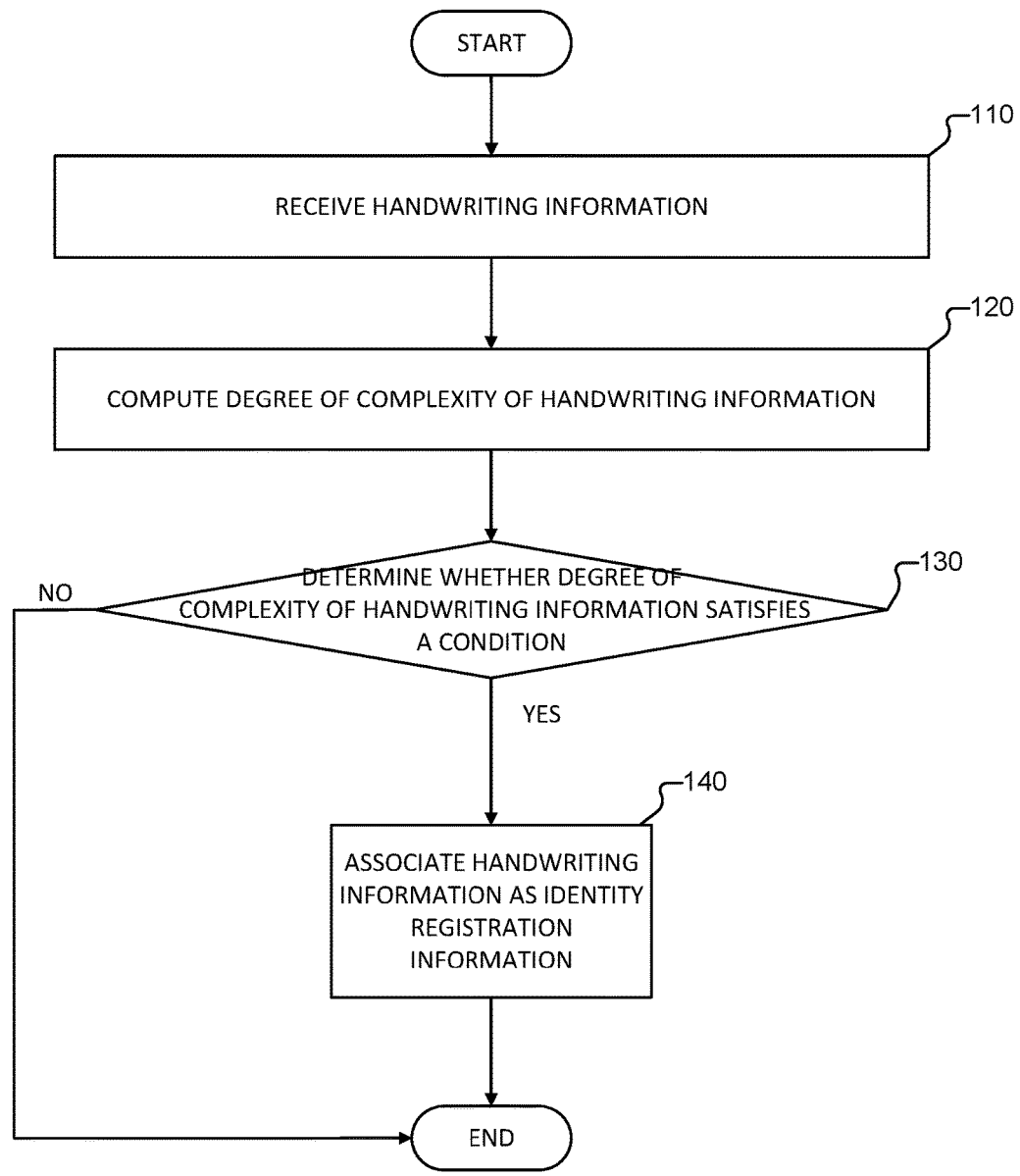
FIG. 1 is a flowchart of a method of registering an identity according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some current systems, a user inputs handwriting information to a terminal in connection with registration of the identity of the user such as registration of the identity of the user with the terminal or a service (e.g., a web-based service). The existing systems typically do not determine the degree of complexity of the handwriting information after the terminal collects the handwriting information entered by the user. Because the degree of complexity of the handwriting information is not performed after the terminal collects the handwriting information from the user, and because the handwriting information is used as the identity registration information, the use of the handwriting information can result in the collected handwriting information (e.g., the user-entered handwriting information) that is used in connection with identity verification being excessively simple and therefore easily imitated. Accordingly, when identity verification is performed based on such excessively simple handwriting information, the identity verification gives rise to potential system security risks. Conversely, because the degree of complexity of the handwriting information is not determined after the terminal collects the handwriting information from the user, the collected handwriting information (e.g., user-entered handwriting information) can be overly complex. The use of overly complex handwriting information in connection with identity verification can result in the occurrence of false non-matches during future login attempts. As a further result, successful verification of user identity can be excessively difficult. In order for the verification of a user identity to be successful in the event that an overly complex handwriting information is used in connection with the identity verification, the user can be required to perform repeated attempts to input handwriting information that matches the registered handwriting information. Requiring repeated attempts by users to input handwriting information that matches the registered handwriting information is inefficient, inconvenient, and wastes system resources.

In some embodiments, a degree of complexity of handwriting information entered by the user (e.g., collected by a terminal) is determined in connection with the registration of the user. For example, when a user registers the user's identity with a terminal or a server, the degree of complexity of the handwriting information is determined. The degree of complexity of the handwriting information can be compared with one or more preset conditions. The one or more preset conditions can include a minimum complexity threshold indicating a minimum degree of complexity that is acceptable for registration, a maximum complexity threshold indicating a maximum degree of complexity that is acceptable for registration, a length threshold, a size threshold, a minimum threshold of strokes in the handwriting, a maximum threshold of strokes in the handwriting, a minimum threshold of handwriting inflection points, a maximum threshold of handwriting inflection points, a minimum threshold of spatial distribution of the handwriting, a maximum threshold of spatial distribution of the handwriting, a minimum threshold of the gradient distribution of the handwriting, a maximum threshold of the gradient distribution of the handwriting, a minimum threshold of the area of the handwriting, a maximum threshold of the area of the handwriting, or the like. The handwriting information is only used in connection with the user's identity registration information if the degree of complexity of the handwriting information satisfies at least one of the one or more preset conditions. In some embodiments, the handwriting information is only stored in association with the user's identity registration information, or used in connection with identity verification of the user, if the handwriting information satisfies all of the one or more preset conditions. In some embodiments, the handwriting information is only stored in association with the user's identity registration information, or used in connection with identity verification of the user, if the handwriting information satisfies a threshold number of the one or more preset conditions. If the handwriting information is determined to not satisfy the requisite preset conditions (e.g., all of the preset conditions, a threshold number of the preset conditions, or the like), the user can be prompted to re-enter handwriting information, the degree of complexity of which is compared to the one or more preset conditions in connection with determining whether the degree of complexity corresponding to the re-entered handwriting information satisfies the requisite preset condition. The user can be prompted to re-enter the handwriting information until the corresponding degree of complexity of the entered information satisfies the requisite preset conditions, thereby effectively avoiding the security issues associated with some related art related to excessively simple handwriting and excessively complex handwriting.

So as to further clarify the objectives, technical solutions, and advantages of the present application, technical solutions of the present application are described clearly and completely below in light of specific embodiments and corresponding drawings of the present application. Obviously, the embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

FIG. 1 is a flowchart of a method of registering an identity according to various embodiments of the present application. Process 100 can be implemented by device 600 of FIG. 6 or computer system 700 of FIG. 7. In some embodiments, process 100 is implemented by a terminal. As an example, the terminal can be a personal computer (PC), a mobile phone, a tablet, a laptop, or other equipment that is configured to receive handwriting input (e.g., collect handwriting information from a user).

At 110, handwriting information is collected. In some embodiments, the terminal collects handwriting information input by the user. The user can input the handwriting information via a touch screen, a graphics tablet, or other hardware interface provided by the terminal. In some embodiments, the user can input the handwriting information using a stylus (e.g., a handwriting touch stylus pen), a user's finger, or the like. Handwriting information input by the user can also be referred to as user-entered handwriting information. A standalone application or a browser-based application can be used to provide the graphical user interface for the user to enter the handwriting information.

The handwriting information can include shapes, images, Chinese characters, characters, numbers, or traces of figures entered in handwritten form by the user. The handwriting information can be selected by the user for use in registration of the user in relation to the terminal, a server, a web service, the like, or any combination thereof. According to various embodiments, the handwriting information can include characters of any language such as Chinese, English, Spanish, or the like.

At 120, a degree of complexity of the handwriting information is computed. The degree of complexity of the handwritten information can be computed by the terminal to which the handwritten information is input, or by a server to which the terminal communicates the handwriting that is entered. For example, a server associated with a web service or the like for which the user is registered or attempting registration in connection with input of the handwritten information can compute the degree of complexity.

The degree of complexity of the handwritten information can be computed by performing a dimension normalization on the collected handwriting information to obtain the handwriting to be analyzed, and thereafter extracting one or more characteristic values from the handwriting to be analyzed. The degree of complexity of the handwriting information can be computed using the one or more characteristic values extracted from the handwriting to be analyzed.

According to various embodiments, the one or more characteristic values comprise a minimum of at least one of a length of the handwriting, a number of strokes in the handwriting, a number of handwriting inflection points, a weighted value of the handwriting inflection points, a spatial distribution of the handwriting, a gradient distribution of the handwriting, and an area of the handwriting.

At 130, it is determined whether the degree of complexity of the handwriting information satisfies one or more preset conditions. The degree of complexity of the handwriting information can be compared with one or more preset conditions. The one or more preset conditions can include a minimum complexity threshold indicating a minimum degree of complexity that is acceptable for registration, a maximum complexity threshold indicating a maximum degree of complexity that is acceptable for registration, a length threshold, a size threshold, a minimum threshold of strokes in the handwriting, a maximum threshold of strokes in the handwriting, a minimum threshold of handwriting inflection points, a maximum threshold of handwriting inflection points, a minimum threshold of spatial distribution of the handwriting, a maximum threshold of spatial distribution of the handwriting, a minimum threshold of the gradient distribution of the handwriting, a maximum threshold of the gradient distribution of the handwriting, a minimum threshold of the area of the handwriting, a maximum threshold of the area of the handwriting, or the like.

According to various embodiments, the preset conditions to which the degree of complexity of the handwriting is compared can be configurable according to user preferences or user settings, administrator preferences or settings, or the like. For example, a user can adjust the minimum degree of complexity and/or maximum degree of complexity of the handwriting information (e.g., the handwriting extracted from the handwriting information) via an interface provided by the terminal or server. As another example, the server or an administrator associated with a web service for which the handwriting information is input in connection with user registration can adjust the minimum degree of complexity and/or maximum degree of complexity of the handwriting information.

In the event that the degree of complexity of the handwriting information does not satisfy the one or more preset conditions, process 100 can end.

In the event that the degree of complexity of the handwriting information satisfies the one or more preset conditions, at 140, the handwriting information is associated with identity registration information (e.g., of the user). The handwriting information can be stored as the identity registration information corresponding to the user. The handwriting information can be stored locally at the terminal, or on a server that is remotely accessible to the user (e.g., a server associated with a web service associated with the user registration).

According to various embodiments, a range of degrees of complexity can be preset. In the event that the degree of complexity of the handwriting information computed at 120 falls into the preset range of degrees of complexity, then the degree of complexity of the handwriting information can be deemed to satisfy the preset conditions. In response to determining that the handwriting information satisfies the preset conditions, the collected handwriting information is saved as the identity registration information.

According to various embodiments, in the event that the degree of complexity of the handwriting information collected by the terminal does not satisfy the preset conditions, then a preset prompt message can be displayed to the user. The preset prompt message can provide an indication that the handwriting information does not satisfy the one or more preset conditions. For example, the preset prompt message can indicate to the user that the handwriting information entered by the user is excessively simple or excessively complex. In some embodiments, the preset prompt message requests the user re-enter the handwriting information. For example, in response to determining that the degree of complexity of the handwriting information does not satisfy the one or more preset conditions, process 100 can prompt the user to re-enter the handwriting information and return to 110.

According to various embodiments, by determining the degree of complexity of the handwriting information in connection with the identity registration, and storing the handwriting information in the event that the degree of complexity satisfies the one or more preset conditions, the handwriting information is used as the user's identity registration information, thereby ensuring that the handwriting information will not be vulnerable to impersonation attacks (e.g., easily replicated by malicious third parties), and preventing the problem of system resource waste as the result of false non-matches occurring as a result of excessively complex handwriting information that makes successful verification of the user identity difficult.

When the user inputs handwriting information, quickly determining which characters are entered by character recognition and determining which characters have degrees of complexity that satisfy the one or more preset conditions may be difficult.

Thus, according to various embodiments, standard characters are provided to the user. For example, the standard characters can serve as a hint to a user. The user determine the characters to be entered (e.g., input) based at least in part on the standard characters. The terminal can provide the standard characters to the user via displaying the standard characters on a display of the terminal. In some embodiments, a server provides the standard characters to the user. The server can provide the standard characters to the user by communicating the standard characters to the terminal, which in turn, provides (e.g., displays) the standard characters to the user. The standard characters can be displayed in a standard font. The standard characters can be provided in a preset language (e.g., a language configured by the terminal or the user according to user preferences or user settings). The degree of complexity of the standard handwriting that comprises the standard characters satisfies one or more preset conditions. The one or more preset conditions can be the same as the one or more preset conditions of 130 of process 100 of FIG. 1. The user is prompted to write these characters in his own handwriting, and the handwriting information that is entered is collected and stored in association with the user's registration information.

In some embodiments, the standard characters to be provided to the user are selected (e.g., by the terminal) based on the attribute information corresponding to the user. In some embodiments, the standard characters to be provided to the user are randomly selected from a standard character library. The standard character library can be stored locally on the terminal. In some embodiments, the standard character library can be stored on a remote database that is accessible by the terminal via network communication. A minimum of one standard character can be provided to the user. According to various embodiments, standard characters include, but are not limited to, standard Chinese characters, characters, figures, numbers, special characters, words, English characters, or the like. The standard characters can include standard characters of various languages.

The attribute information corresponding to the user that can be used to select the standard characters to be provided to the user can include the geographical location corresponding to the network segment on which the IP address corresponding to the user is located (e.g., the geographical location of the terminal used by the user), search keywords commonly used by the user (e.g., determined according to cached search queries or recorded search logs), content followed by the user, information associated with a profile of the user, the like, or any combination thereof. As an example, terminal or a web service can be used to determine search keywords commonly used by the user based on historical information relating to the use of the terminal or web service by the user.

In the event that the standard characters to be provided to the user are selected based on the geographical location corresponding to the network segment on which the IP address corresponding to the user is located (e.g., the geographical location of the terminal used by the user), the standard characters can be characters or words associated with the geographical location corresponding to the user. For example, if the geographical location corresponding to the network segment on which the IP address corresponding to the user is located in Beijing, then standard characters related to Beijing can be provided to the user. As an example, Beijing is the capital city, accordingly, the standard character provided can be the character "shou" (首, "primary") from the word "shoudu" (首都, "primary city" or "capital"), or the character "jing" (经, "deal in"), which is a homophone of the character "jing" (京, "capital," from "Beijing"), or the character "nan" (南, "south"), which is an antonym of the character "bei" (北, "north" from "Beijing," "northern capital"), or the like.

Standard characters to be provided to the user can be selected based on search keywords commonly used by the user, for example, the search keywords commonly used by the user can include "waitao" (外套, "coat") and "pingguo" (苹果, "apple"). Using "waitao" and "pingguo" as examples of standard characters selected based on search keywords commonly used by the user, the degree of complexity of "wai" (外, "outer"), "ping" (苹, "apple") and "guo" (果, "fruit") can be deemed to satisfy the one or more preset conditions. The one or more preset conditions can be the same as the one or more preset conditions of 130 of process 100 of FIG. 1. Accordingly, one or more of the standard characters "wai," "ping," and "guo" that are deemed to satisfy the one or more preset conditions can be provided to the user as standard characters.

Standard characters to be provided to the user can be selected based on content followed by the user as determined by, for example, user subscription of content or news channels, frequently viewed pages, etc. For example, the standard characters can be selected according to content associated with "finance and economics" (财经, "caijing"). Using "caijing" as an example of standard characters selected based on content followed by the user, the degree of complexity of both of the characters "cai" (财, "finance") and "jing" (经, "economics") can be deemed to satisfy the one or more preset conditions. Accordingly, the characters for "cai" and "jing" can be provided to the user as standard characters, or characters related to finance and economics that have degrees of complexity that are deemed to satisfy the one or more preset conditions can be provided to the user, for example, "gu" (股, "stock"), "shi" (市, "market"), "lou" (楼, "building"), and "jia" (价, "price"). The one or more preset conditions can be the same as the one or more preset conditions of 130 of process 100 of FIG. 1. According to various embodiments, other content can be followed by the user and used in connection with the selection of the standard characters. For example, content followed by the user can include a web page visited by the user, a social media profile viewed by the user, a video subscription (e.g., a YouTube™ channel followed by the user), a sports team followed by the user (that can be determined based on news subscriptions, feeds, or updates registered by the user), or the like.

Because the attribute information of different users is different, the standard characters selected to be provided (e.g., recommended) to different users are different. Accordingly, selection of standard characters based on attribute information of a user will likely not result in the recommendation of standard characters that are completely identical to different users.

Figure 2A:
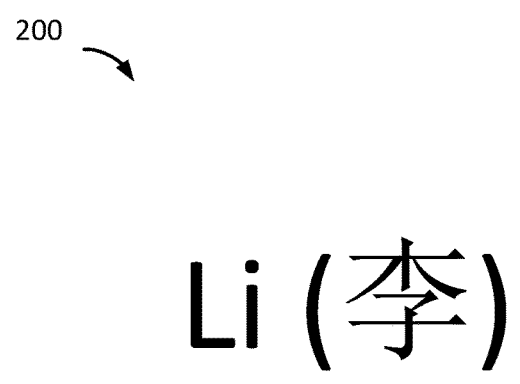

FIG. 2A illustrates information used in connection with registering an identity according to various embodiments of the present application. Standard character 200 can be used in connection with process 100 For example, standard character 200 can be provided (e.g., recommended) to the user based on attribute information of the user.

The character "li" (李, a common surname) illustrated in FIG. 2A is the standard character "li" (李) provided to the user by the terminal. The standard character "li" (李) is in a standard computer font.

Figure 2B:
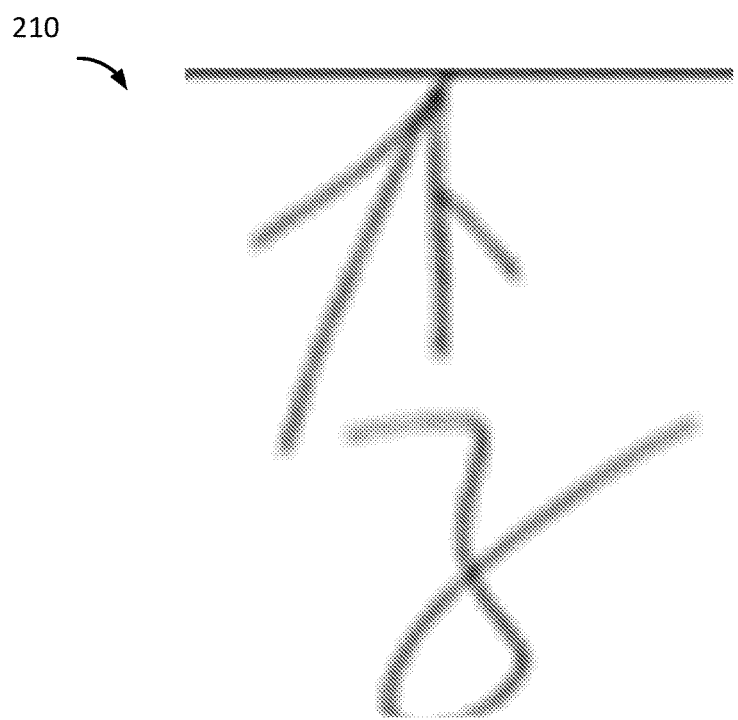
FIG. 2B illustrates a handwriting used in connection with registering an identity according to various embodiments of the present application.

FIG. 2B illustrates a handwriting used in connection with registering an identity according to various embodiments of the present application. Character 210 can be used in connection with process 100 For example, character 210 can be input by the user in connection with user registration or registration of the identity registration information corresponding to the user.

The character "li" (李) shown in FIG. 2B is the handwritten form of the character "li" (李) and can correspond to handwriting information input by the user.

In the event that the standard characters selected to be provided to the user are randomly selected from a standard character library, then a standard character library can be created. The standard character library can include characters having a degree of complexity that satisfies the one or more preset conditions. For example, all standard characters saved in this standard character library satisfy the one or more preset conditions. The terminal can randomly select the standard characters to be provided to the user from the standard character library.

According to various embodiments, the standard characters provided to the user can form a basis for the handwriting information input by the user. For example, the standard characters can serve as a recommendation for handwriting information to be input by the user in connection with user registration or registration of the identity registration information corresponding to the user. The user can input handwriting information that includes similar or the same characters as the standard characters provided to the user.

In the event that the user inputs handwriting information based on the standard characters provided by the terminal, the user can select one character from the standard characters provided by the terminal, and then enter this standard character in accordance with the handwriting input habits of the user. The terminal uses the collected handwriting information as the handwriting information entered by the user based on the standard character.

In response to the terminal collecting the handwriting information input by the user, the degree of complexity of the handwriting information is determined.

Figure 3:
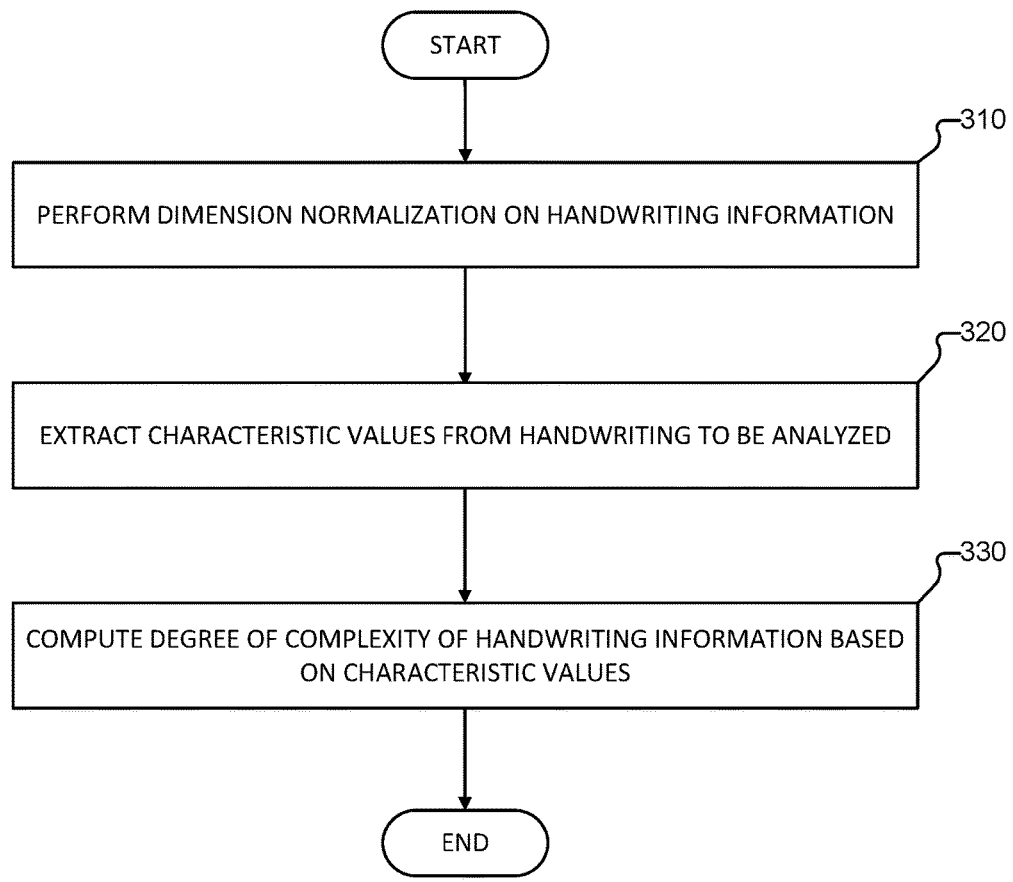
FIG. 3 is a flowchart of a method of registering an identity according to various embodiments of the present application.

FIG. 3 is a flowchart of a method of registering an identity according to various embodiments of the present application. Process 300 can be implemented by device 600 of FIG. 6 or computer system 700 of FIG. 7. In some embodiments, process 300 is implemented in connection with 120 of process 100 of FIG. 1. In some embodiments, process 100 is implemented by a terminal. As an example, the terminal can be a personal computer (PC), a mobile phone, a tablet, a laptop, or other equipment that is configured to receive handwriting input (e.g., collect handwriting information from a user).

At 310, a dimension normalization is performed on the handwriting information. The handwriting to be analyzed can be obtained via the dimension normalization of the handwriting information input by the user.

The performance of dimension normalization on the collected handwriting information can eliminate the dimension effects of the handwriting included in the handwriting information. In some embodiments, the dimension normalization includes selecting the greater of the width of the handwriting along the X axis and the height of the handwriting along the Y axis to serve as one unit of length. The X axis and the Y axis are perpendicular to each other. The relevant characteristic values of the handwriting can be tabulated based on the selected unit of length. For example, if the width of the handwriting along the X axis is 10 mm, and the height along the Y axis is 8 mm, then the width of the handwriting along the X axis is selected to be used as one unit of length. Accordingly, the height of the handwriting along the Y axis can be converted to 0.8 unit of length. In some embodiments, the handwriting is scaled into a uniform rectangular area according to the original proportions, and the length of one side of the uniform rectangular area is used as the unit of length. The relevant characteristic values of the handwriting can be tabulated based on this unit of length.

When the user inputs handwriting to the terminal, the handwriting generally includes faint wobbling because of mild, inherent hand tremors and because the terminal is sensitive enough to recognize the wobbling inherent in a user's handwriting. The faint wobbling can specifically appear as mild undulation in the handwriting information. Therefore, according to various embodiments, the handwriting to be analyzed obtained after dimension normalization is filtered in order to reduce the mild undulation generated as the result of the wobbling. The filtering on the handwriting to be analyzed is performed under the precondition that the overall appearance of the handwriting is unchanged by the filtering. If the wobbling is filtered from the handwriting and the overall appearance of the handwriting is unchanged by the filtering, the potential for errors in subsequent computation of the characteristic values of the handwriting is reduced. For example, errors in the computation of the characteristic values can include errors in the computation of the length of the handwriting, the number of inflection points in the handwriting, the spatial distribution of the handwriting, the gradient distribution of the handwriting, or the like. The position coordinates of the undulation points can be adjusted using mean filtering, Gaussian filtering, Median filtering, low pass filtering, or the like. In some embodiments, a filter mask is applied to the bitmap of the handwriting image according to known techniques. The position of the undulation points can be adjusted so that the variances of the connecting lines between corresponding undulation points and the two adjacent points are lessened in order to reduce the undulation.

At 320, one or more characteristic values are extracted from the handwriting to be analyzed. The one or more characteristic values can include a length of the handwriting, a number of strokes of the handwriting, a number of inflection points of the handwriting, an inflection weight of the handwriting, a spatial distribution of the handwriting, a gradient distribution of the handwriting, an area of the handwriting, the like, or any combination thereof.

At 330, a degree of complexity of the handwriting information is computed based on at least one of the one or more characteristic values extracted from the handwriting to be analyzed.

According to various embodiments, a length of the handwriting is the sum of the length of the strokes of the handwriting. For example, the length of the handwriting can be the sum of the length of all the strokes of the handwriting. Because each stroke of the handwriting is represented as multiple pixel points on the screen, the length of each stroke is equal to the sum of the distances between all adjacent pixel points, thus a length can be obtained for each stroke. The lengths of all strokes can be summed to obtain the length of the handwriting. In some embodiments, a stroke corresponds to a portion of the handwriting input between a pixel point at which an input of a portion of the handwriting is started and a pixel point at which the input is lifted. If the handwriting is input using a stylus, a stroke can be determined according to a point at which the terminal receives an input from the stylus (e.g., when the stylus is touched to the screen such as a touchscreen of the terminal) and a point at which input from the stylus is stopped (e.g., when the stylus is lifted from contacting the screen of the terminal).

According to various embodiments, a number of strokes of the handwriting is the sum of all strokes of the handwriting. The number of strokes can be tabulated by recognizing the user's actions to apply (e.g., hold down) an input device (e.g., a user's finger, a stylus pen, or the like). In the event that the terminal recognizes that the input device leaves the screen, the terminal recognizes a user action to lift the input device. In the event that the terminal recognizes that the input device begins to touch the screen, the terminal recognizes a user action to apply the input device. In the event that the terminal recognizes application of the input device by the user to lifting action of the input device, the terminal has recognized a stroke. The quantity of all recognized strokes is summed to obtain the number of strokes of the handwriting.

According to various embodiments, the number of inflection points is the number of times that a change occurs in the handwriting direction. A change in the handwriting direction can be determined according to a determination that a change has occurred in the variation trend of the handwriting along the X axis or the Y axis. The angle of intersection formed by the respective connecting lines between the point of change and the two adjacent points that is present at the place in the handwriting at which the change occurs can be compared to a preset angle threshold value in connection with determining whether a change in the handwriting direction occurs. The angle of intersection corresponds to the angle of intersection formed in accordance with the direction of the handwriting movement. If the angle of intersection formed by the respective connecting lines between the point of change and the two adjacent points that is present at the place in the handwriting at which the change occurs is less than a preset angle threshold value, then the change point is determined to be an inflection point. For example, if the handwriting originally exhibits a rising trend on the X axis, but begins to exhibit a falling trend on the X axis at a certain change point, then a change has occurred in the handwriting direction, and an inflection point may appear at this location. It is determined whether the angle of intersection formed by the connecting lines between this change point and the two adjacent points is less than the preset angle threshold value. If the angle of intersection is less than the preset angle threshold value, then the corresponding change point is determined to be an inflection point. In some embodiments, the preset angle threshold value is 160°, 170°, or the like.

Figure 4:
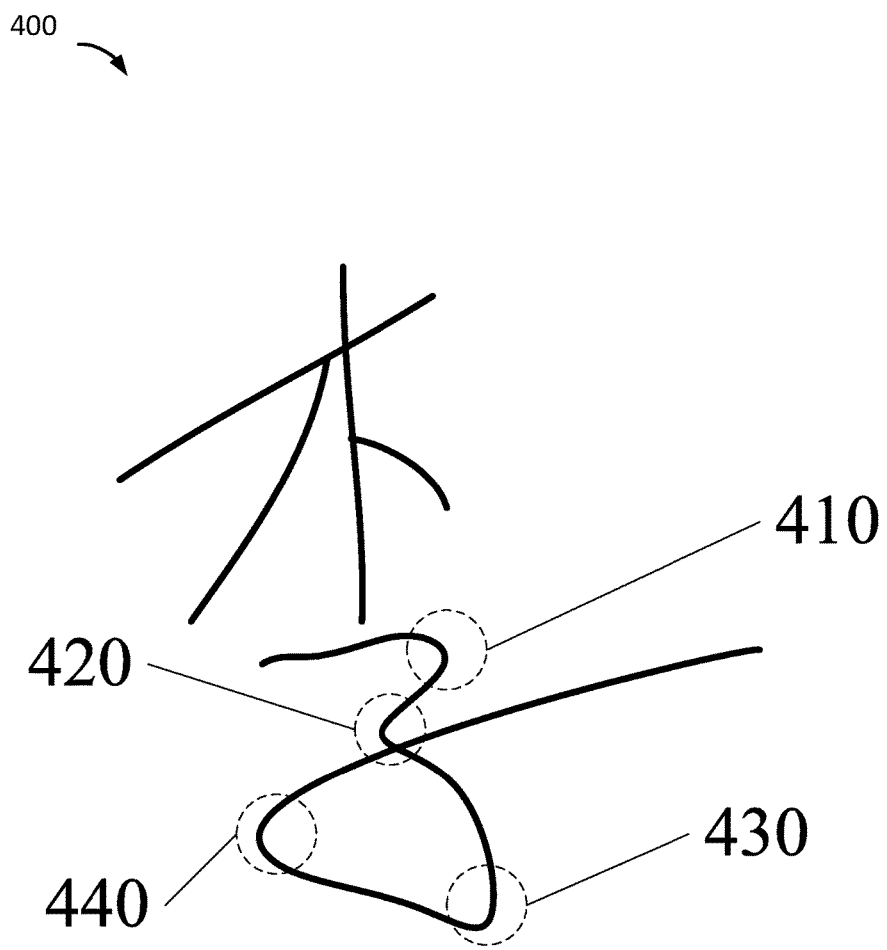
FIG. 4 illustrates handwriting associated with a process of registering an identity according to various embodiments of the present application.

FIG. 4 illustrates handwriting associated with a process of registering an identity according to various embodiments of the present application. Handwriting 400 can be input to a terminal in connection with a process of registering an identity of a user. For example, handwriting 400 can be input in connection with process 100 of FIG. 1. The terminal can store handwriting information corresponding to handwriting 400. In some embodiments, process 300 is implemented in connection with analyzing handwriting 400.

Handwriting 400 includes inflection points 410, 420, 430, and 440. Handwriting 400 corresponds to character "li" ( 李 ) input as handwriting information.

Figure 5:
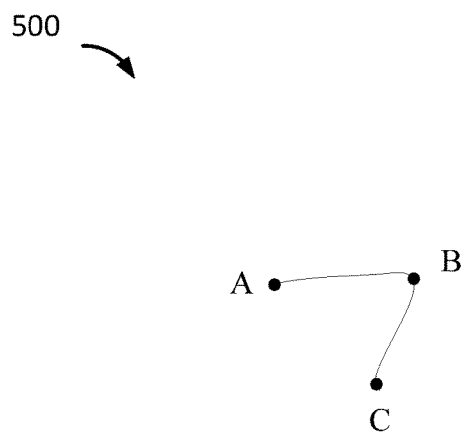
FIG. 5 illustrates a process of registering an identity according to various embodiments of the present application.

FIG. 5 illustrates a process of registering an identity according to various embodiments of the present application. Segment 500 of handwriting can correspond to a segment of handwriting. For example, segment 500 can correspond to a portion of handwriting 400 of FIG. 4 including inflection point 410. In some embodiments, segment 500 is analyzed.

The direction of the handwriting movement of segment 500 is from point A to point B, and then from point B to point C. From point A to point B, the handwriting movement exhibits a rising trend on the X axis coordinate. In the process from point B to point C, the X axis coordinate value of the handwriting begins to decline, thus a change in the handwriting movement can be determined to have occurred. The angle of intersection formed by the connecting lines between B and the adjacent points A and C can be determined to be less than 160°. Accordingly, in the event that the preset angle threshold value is 160°, point B (e.g., corresponding to 410 of FIG. 4) can be determined to be an inflection point. The inflection points 420, 430, and 440 of FIG. 4 can be similarly determined.

According to various embodiments, an inflection point weight of the handwriting includes tabulation of the number of inflection points on each stroke, and determination of an inflection point weight for each stroke based on the number of inflection points on each stroke. The sum obtained by adding together the inflection point weights of all strokes corresponds to the inflection point weight of the handwriting. With respect to a particular stroke, the greater the number of inflection points included in the particular stroke, the greater the inflection point weight of the stroke. The correspondence relationship of the inflection point weight of a stroke Q(N), the stroke Q, and the number of inflection points on the stroke N, can be expressed according to Equation (1):

$$Q(N) \geq Q(a)+Q(b)+Q(c)+Q(d) \ldots +Q(n) \qquad (1)$$

where $a+b+c+d \ldots +n=N$. Q(N) represents the weight of a stroke, and a, b, c, d, etc. respectively correspond to different inflection points on the stroke. According to Equation (1), when the number of inflection points in the handwriting is the same, the fewer the number of strokes on which inflection points are present, and the greater the inflection point weight of the handwriting. In other words, the inflection point weight of the handwriting is inversely related to the number of strokes on which the inflection points are present.

As example, in the correspondence between the preset number of inflection points contained in a stroke and the inflection point weight of the stroke, if a first stroke does not have any corresponding inflection points, then the inflection point weight of the first stroke can be set as 1. If a second stroke has one corresponding inflection point, then the inflection point weight of the second stroke can be set as 2. If a third stroke has two corresponding inflection points, then the inflection point weight of the third stroke can be set as 4. If a fourth stroke has three corresponding inflection points, then the inflection point weight of the fourth stroke can be set as 7. Various strokes can have various corresponding inflection point weights according to Equation (1). As an example, if N=3, a=1, and b=2, and Q(3)=7, Q(a)=Q(1)=2, Q(b)=Q(2)=4, then Q(3)≥Q(1)+Q(2).

According to various embodiments, a spatial distribution of the handwriting can be determined, based on the greater of the width of the handwriting along the X axis and the height of the handwriting along the Y axis that can be used as the side length. The greater of the width of the handwriting along the X axis and the height of the handwriting along the Y axis can be used as the side length to form a square that encloses the handwriting. The square can be divided into n square boxes. The ratio of the number of square boxes that are occupied by the handwriting to the total number of square boxes n can be tabulated (e.g., computed) to serve as the spatial distribution of the handwriting. A particular square box is deemed to be occupied by the handwriting if at least a part of the handwriting is included in the particular square box. In some embodiments, the square box is deemed to be occupied if a threshold percentage of the square box is overlapped with the handwriting. n is a natural number greater than a preset threshold value. According to various embodiments, the greater the value of n, the more accurate the tabulated value of the spatial distribution of the handwriting. For example, if the square is divided into 100 equal square boxes, the number of square boxes occupied by the handwriting is tabulated in order to obtain the percentage of the total number of boxes occupied by the handwriting. The percentage of the total number of boxes occupied by the handwriting corresponds to the spatial distribution of the handwriting.

According to various embodiments, a gradient distribution of the handwriting is determined according to a number of partitions to which the angles of intersection of connecting lines between two adjacent points and the X axis belong. In some embodiments, the angle of intersection of 0-2π is divided into different partitions, the partitions to which the angles of intersection of the connecting lines of two adjacent points in each stroke and the X axis belong are determined, and a sum of the number of partitions to which the angles of intersection of the connecting lines between two adjacent points and the X axis belong is tabulated (e.g., computed) for the strokes (e.g., all strokes of the corresponding handwriting) to obtain the gradient distribution of the handwriting. For example, if an angle of intersection of 0-2π is divided into 8 partitions, with each partition corresponding to π/4, and if all of the angles of intersection between the connecting lines between two adjacent points and the X axis in the first stroke of the collected handwriting information belong to one partition (e.g., the first partition (0-π/4)), if the angles of intersection between the connecting lines between two adjacent points and the X axis in the second stroke belong to two partitions (e.g., the second partition (π/4-π/2) and the fourth partition (3π/4-π)), and if all of the angles of intersection between the connecting lines between two adjacent points and the X axis in the third stroke belong to one partition (e.g., the first partition (0-π/4)), then the gradient distribution of this handwriting is 1+2+1=4.

According to various embodiments, the area of the handwriting is determined based on the width of the handwriting along the X axis and the height of the handwriting along the Y axis. The width of the handwriting along the X axis and the height of the handwriting along the Y axis are respectively used as the length and width of a rectangle. The rectangle formed by the width of the handwriting and the height of the handwriting forms a rectangle that encloses the handwriting. The area of the rectangle corresponds to the area of the handwriting.

Returning to FIG. 3, after the various characteristic values of the handwriting to be analyzed are determined at 320, the degree of complexity of the handwriting information can be determined based on the various characteristic values. In some embodiments, the degree of complexity comprises a first degree of complexity value and a second degree of complexity value. The first degree of complexity value corresponds to a value used to determine the degree of simplicity of the handwriting, and the second degree of complexity value is used to determine the degree of complexity of the handwriting. The degree of complexity of the handwriting information is determined based on one or more characteristic values (e.g., the first degree of complexity value and the second degree of complexity value of the handwriting information are determined based on one or more characteristic values). In some embodiments, the degree of simplicity is trained using a machine learning process.

The determination of the degree of complexity of the handwriting information includes determining first products for each of the characteristic values and a corresponding first weight, and determining second products for each of the characteristic values and a corresponding second weight.

The sum obtained by adding together each of the determined first products corresponds to the first degree of complexity value of the handwriting information. The sum obtained by adding together each of the determined second products corresponds to the second degree of complexity value of the handwriting information.

The first weight can be a degree of simplicity weight. For example, each characteristic value corresponds to a degree of simplicity weight. A first product for each characteristic value is obtained by multiplying each characteristic value by the corresponding degree of simplicity weight. The sum obtained by adding together the first products of each characteristic value serves as the first degree of complexity value of the collected handwriting information. For example, the sum obtained by adding together the first products of each characteristic value serves as the first degree of complexity value to determine the degree of simplicity of the handwriting.

For example, if each of the characteristic values is expressed using f1, f2, f3, f4, f5, f6, and f7, respectively, and the first weight corresponding to each characteristic value is expressed using ws1, ws2, ws3, ws4, ws5, ws6, and ws7, respectively, then the first products for each of the characteristic values can be expressed as f1×ws1, f2×ws2, f3×ws3, f4×ws4, f5×ws5, f6×ws6, and f7×ws7, and the sum obtained by adding together the first products for each of the characteristic values can be expressed according to Equation (2). Score1 can represent the first degree of complexity value.

$$\text{Score1}=f1\times ws1+f2\times ws2+f3\times ws3+f4\times ws4+f5\times ws5+f6\times ws6+f7\times ws7 \quad (2)$$

The second weight can be a degree of complexity weight. For example, each characteristic value corresponds to a degree of complexity weight. A second product for each characteristic value is obtained by multiplying each characteristic value by the corresponding degree of complexity weight. The sum obtained by adding together the second products of each characteristic value serves as the second degree of complexity value of the collected handwriting information. For example, the sum obtained by adding together the second products of each characteristic value serves as the value to determine the degree of complexity of the handwriting.

For example, if each of the characteristic values is expressed using f1, f2, f3, f4, f5, f6, and f7, respectively, and the first weight corresponding to each characteristic value is expressed using wc1, wc2, wc3, wc4, wc5, wc6, and wc7, respectively, then the first product for each characteristic value can be expressed as: f1×wc1, f2×wc2, f3×wc3, f4×wc4, f5×wc5, f6×wc6, and f7×wc7, and the sum obtained by adding together the first products of each of the characteristic values can be expressed according to Equation (3). Score2 can represent the second degree of complexity value.

$$\text{Score2}=f1\times wc1+f2\times wc2+f3\times wc3+f4\times wc4+f5\times wc5+f6\times wc6+f7\times wc7 \quad (3)$$

Score1 of Equation (2) and Score2 of Equation (3) respectively correspond to the first degree of complexity value and the second degree of complexity value of the handwriting information determined based on the characteristic values.

The computations described above for the first degree of complexity value and the second degree of complexity value correspond to examples in which the seven characteristic values are extracted from the handwriting information. According to various embodiments, different numbers of characteristic values can be extracted from the handwriting information.

In the event that the degree of complexity of the handwriting information is determined (e.g., at 120 of process 100 of FIG. 1), it can be determined whether the degree of complexity satisfies one or more preset conditions.

According to various embodiments, in the event that the first degree of complexity value and the second degree of complexity value are determined to fall into a preset range, the degree of complexity of the handwriting information is determined to satisfy the one or more preset conditions. The preset range can be bounded by a maximum threshold defined by at least one preset condition and a minimum threshold defined by at least one preset condition.

Because the first degree of complexity value (e.g., Score1) corresponds to a value used in determining the degree of simplicity of the handwriting included in the handwriting information, a first threshold value τ1 can be set for the first degree of complexity value. In some embodiments, the first threshold value can be set using a sigmoid function. The first threshold value τ1 corresponds to the threshold value for determining the degree of simplicity of the handwriting. The value of τ1 can be set as 0.5. The first threshold value τ1 can be set to other values. The terminal can perform normalization on the first degree of complexity value so that the normalized value of the first degree of complexity value is between 0 and 1. Normalization of the first degree of complexity value facilitates comparison with the first threshold value τ1. Specifically, the terminal can compute a value x(Score1). x can be a sigmoid function. The terminal can determine whether x(Score1) is less than the first threshold value τ1. If x(Score1) is less than τ1, then the handwriting can be deemed a simple character. In the event that the handwriting is deemed a simple character, the handwriting is determined to not satisfy the one or more preset conditions.

Because the second degree of complexity value (e.g., Score2) corresponds to a value used in determining the degree of complexity of the handwriting included in the handwriting information, a second threshold value τ2 can be set for the second degree of complexity value. In some embodiments, the second threshold value can be set using a sigmoid function. The second threshold value τ2 corresponds to the threshold value for determining the degree of complexity of the handwriting. The value of τ2 can be set as 0.5. The second threshold value τ2 can be set to other values. The terminal can perform normalization on the second degree of complexity value so that the normalized value of the second degree of complexity value is between 0 and 1. Normalization of the second degree of complexity value facilitates comparison with the second threshold value τ2. The terminal can compute a value x(Score2). The terminal can determine whether the value x(Score2) is greater than or equal to the second threshold value τ2. If x(Score2) is greater than or equal to τ2, then the handwriting can be deemed a complex character. In the event that the handwriting is deemed a simple character, the handwriting is determined to not satisfy the one or more preset conditions.

In the event that the degree of complexity of the handwriting satisfies the one or more preset conditions, the first degree of complexity value x(Score1) and the second degree of complexity value x(Score2) fall into a preset range (e.g., the first degree of complexity value and the second degree of complexity value simultaneously satisfy x(Score1)≥τ1 and x(Score2)<τ2).

In the event that standard handwriting of the standard characters is provided to the user, the corresponding degree of complexity of the standard handwriting must also satisfy the preset conditions. For example, the first degree of complexity value obtained through computations based on the standard handwriting, after computing the sigmoid function (e.g., x(i)) on the standard handwriting, is greater than or equal to the first threshold value, and the second degree of complexity value, after computing the sigmoid function (e.g., x(i)) on the standard handwriting, is less than the second threshold value. In some embodiments, the method of computing the degree of complexity of the standard handwriting is the same as the method of computing the degree of complexity of the collected handwriting information. For example, the various characteristic values of the standard handwriting are retrieved directly (e.g., dimension normalization and filtering of the standard handwriting are not necessary), and the degree of complexity of the standard handwriting is determined based on the various retrieved characteristic values. Because the degree of complexity of the standard handwriting of the standard characters provided to the user satisfies the one or more preset conditions, and the degree of complexity of the handwriting information entered by the user based on the standard characters will fluctuate within a neighboring range centered around the degree of complexity of the standard characters, therefore, it is easy for the user to input handwriting information for which the degree of complexity satisfies the one or more preset conditions.

In the event that the degree of complexity of the handwriting information is determined to satisfy the one or more preset conditions, the handwriting information is saved as the identity registration information. Accordingly, the identity of the user can subsequently be verified based on this saved identity registration information.

The identity registration as described above can be executed by the terminal, and can also be executed by software installed on the terminal.

According to various embodiments, an identity of a user can be verified using the handwriting information that is saved as identity registration information. For example, in connection with a process to verify a particular user, the particular user can be prompted to input handwriting information. In response to obtaining the handwriting information input by the particular user, the handwriting information can be compared with the saved identity registration information (e.g., handwriting information saved in association with a user in connection with a registration process). Verification (e.g., authentication) of the particular user can be based on determining whether the handwriting information input by the particular user matches the saved identity registration information. The handwriting information can be deemed to match the saved identity registration information if the handwriting information is within a threshold degree of similarity of the saved identity registration information.

In some embodiments, a particular user is prompted to input handwriting information in response to the user attempting (e.g., requesting) to access a data domain (e.g., the mobile terminal, a server, a web service, or the like). The particular user can be prompted to input the handwriting information in conjunction with another identifier associated with the particular user (e.g., a user id or the like). In response to receiving the user identifier associated with the particular user, the saved identity registration information corresponding to the user identifier can be retrieved. The saved identity registration information and the handwriting information input by the particular user are used to authenticate the particular user. In the event that the particular user is authenticated, the particular user is granted access to the mobile terminal, the server, the web service, or the like. In the event that the particular user is not authenticated (e.g., if the handwriting information input by the particular user does not match the saved identity registration information), the particular user can be denied access to the mobile terminal, the server, the web service, or the like. In addition, in the event that the particular user is not authenticated, the particular user can be prompted to re-enter handwriting information in connection with the verification or authentication process.

Figure 6:
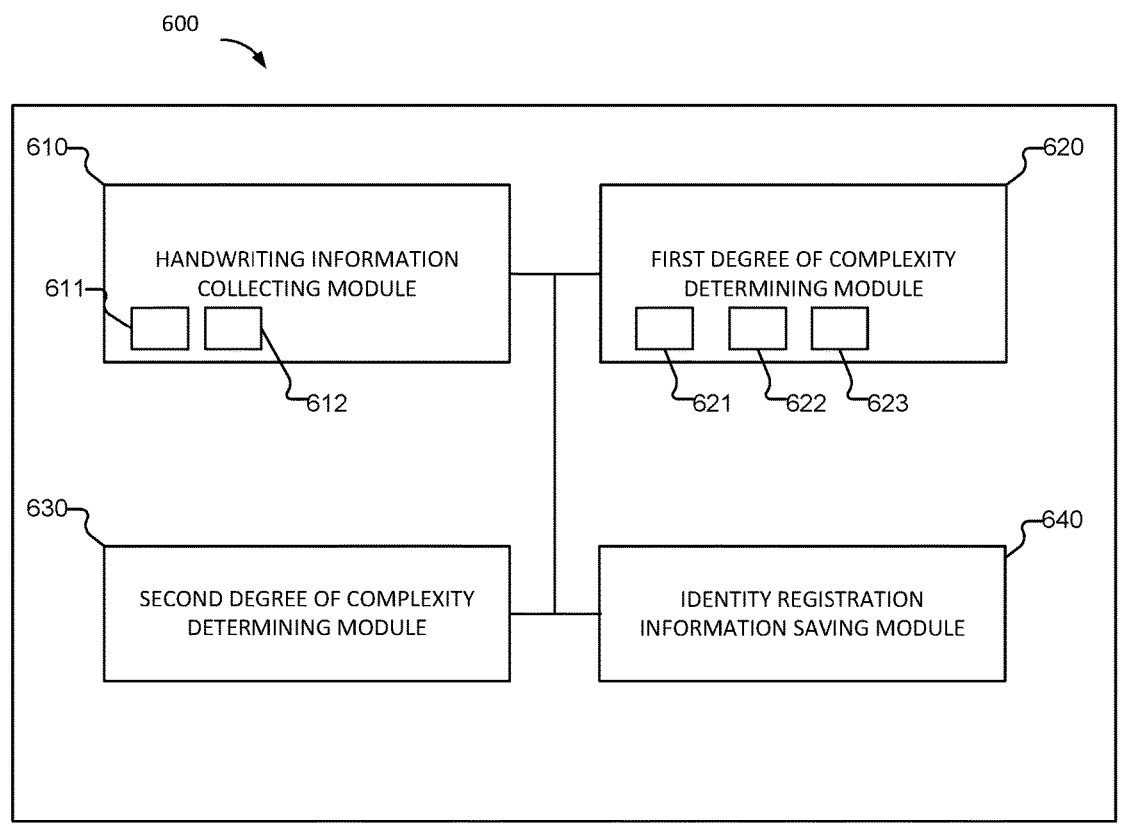
FIG. 6 is a structural diagram of a device to register an identity according to various embodiments of the present application.

FIG. 6 is a structural diagram of a device to register an identity according to various embodiments of the present application. Device 600 can implement process 100 of FIG. 1, or process 300 of FIG. 3. Device 600 can be implemented in computer system 700 of FIG. 7. As an example, device 600 can be a personal computer (PC), a mobile phone, a tablet, a laptop, or other equipment that is configured to receive handwriting input (e.g., collect handwriting information from a user).

According to various embodiments, device 600 includes a handwriting information collecting module 610, a first degree of complexity determining module 620, a second degree of complexity determining module 630, and an identity registration information saving module 640.

The handwriting information collecting module 610 is configured to collect handwriting information input by the user. The user can input the handwriting information via a touch screen or other interface provided by the terminal. In some embodiments, the user can input the handwriting information using a stylus (e.g., a handwriting touch stylus pen), a user's finger, or the like.

The handwriting information can be selected by the user for use in registration of the user in relation to the terminal, a server, a web service, the like, or any combination thereof. According to various embodiments, the handwriting information can include characters of any language such as Chinese, English, Spanish, or the like.

The handwriting information collecting module 610 can include a providing sub-module 611 and a collecting sub-module 612.

The providing sub-module 611 is configured to provide (e.g., recommend) standard characters to the user. The standard characters include standard handwriting, and the degree of complexity of the standard handwriting comprising the standard characters satisfies one or more preset conditions. The providing sub-module 611 can provide the standard characters to the user via displaying the standard characters on a display included in, or otherwise connected to, device 600.

In some embodiments, the standard characters to be provided to the user are selected (e.g., by the terminal) based on the attribute information corresponding to the user. In some embodiments, the standard characters to be provided to the user are randomly selected from a standard character library. The standard character library can be stored locally on device 600. In some embodiments, the standard character library can be stored on a remote database that is accessible by device 600 via network communication.

The collecting sub-module 612 is configured to collect the handwriting by the user. The user can input handwriting based on the standard characters.

According to various embodiments, the standard characters provided to the user can form a basis for the handwriting information input by the user. For example, the standard characters can serve as a recommendation for handwriting information to be input by the user in connection with user registration or registration of the identity registration information corresponding to the user. The user can input handwriting information that includes similar or the same characters as the standard characters provided to the user.

The first degree of complexity determining module 620 is configured to determine the degree of complexity of the handwriting information.

The degree of complexity of the handwritten information can be computed by performing a dimension normalization on the collected handwriting information to obtain the handwriting to be analyzed, and thereafter extracting one or more characteristic values from the handwriting to be analyzed. The degree of complexity of the handwriting information can be computed using the one or more characteristic values extracted from the handwriting to be analyzed.

In some embodiments, the first degree of complexity determining module 620 includes a processing sub-module 621, an extracting sub-module 622, and a determining sub-module 623.

The processing sub-module 621 is configured to perform dimension normalization on the handwriting information. The processing sub-module 621 obtains handwriting to be analyzed by performing a dimension normalization on the collected handwriting information.

The extracting sub-module 622 is configured to extract the characteristic values of the handwriting to be analyzed. According to various embodiments, the one or more characteristic values comprise a minimum of at least one of a length of the handwriting, a number of strokes in the handwriting, a number of handwriting inflection points, a weighted value of the handwriting inflection points, a spatial distribution of the handwriting, a gradient distribution of the handwriting, and an area of the handwriting.

The determining sub-module 623 is configured to determine the degree of complexity of the handwriting information based on the characteristic values.

According to various embodiments, the determining sub-module 623 is configured to determine first products for each of the characteristic values and a corresponding first weight, and determine second products for each of the characteristic values and a corresponding second weight. The determining sub-module 623 obtains a first degree of complexity value (e.g., Score1) of the handwriting information by summing the various determined first products. The determining sub-module 623 obtains a second degree of complexity value (e.g., Score2) of the handwriting information by summing the various determined second products.

The second degree of complexity determining module 630 is configured to determine whether the degree of complexity satisfies the one or more preset conditions. The second degree of complexity determining module 630 determines whether the first degree of complexity value (e.g., Score1) and the second degree of complexity value (e.g., Score2) fall into a preset range (e.g., whether the first degree of complexity value and the second degree of complexity value simultaneously satisfy x(Score1)≥τ1 and x(Score2) <τ2).

The identity registration information saving module 640 is configured to save the handwriting information as the identity registration information. The identity registration information saving module 640 saves the handwriting information as the identity registration information in the event that second degree of complexity determining module 630 determines that the degree of complexity satisfies the one or more preset conditions.

The modules (or sub-modules) described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

According to various embodiments, the terminal collects handwriting information input by the user, and determines the degree of complexity of the handwriting information. In the event that the degree of complexity satisfies one or more preset conditions, the handwriting information is saved as the identity registration information. The handwriting information saved as the identity registration information will not be vulnerable to impersonation attacks, and problems associated with system resource waste caused by the inability to successfully verify the user's identity due to false non-matches because the handwriting information entered by the user is excessively complex are prevented.

Figure 7:
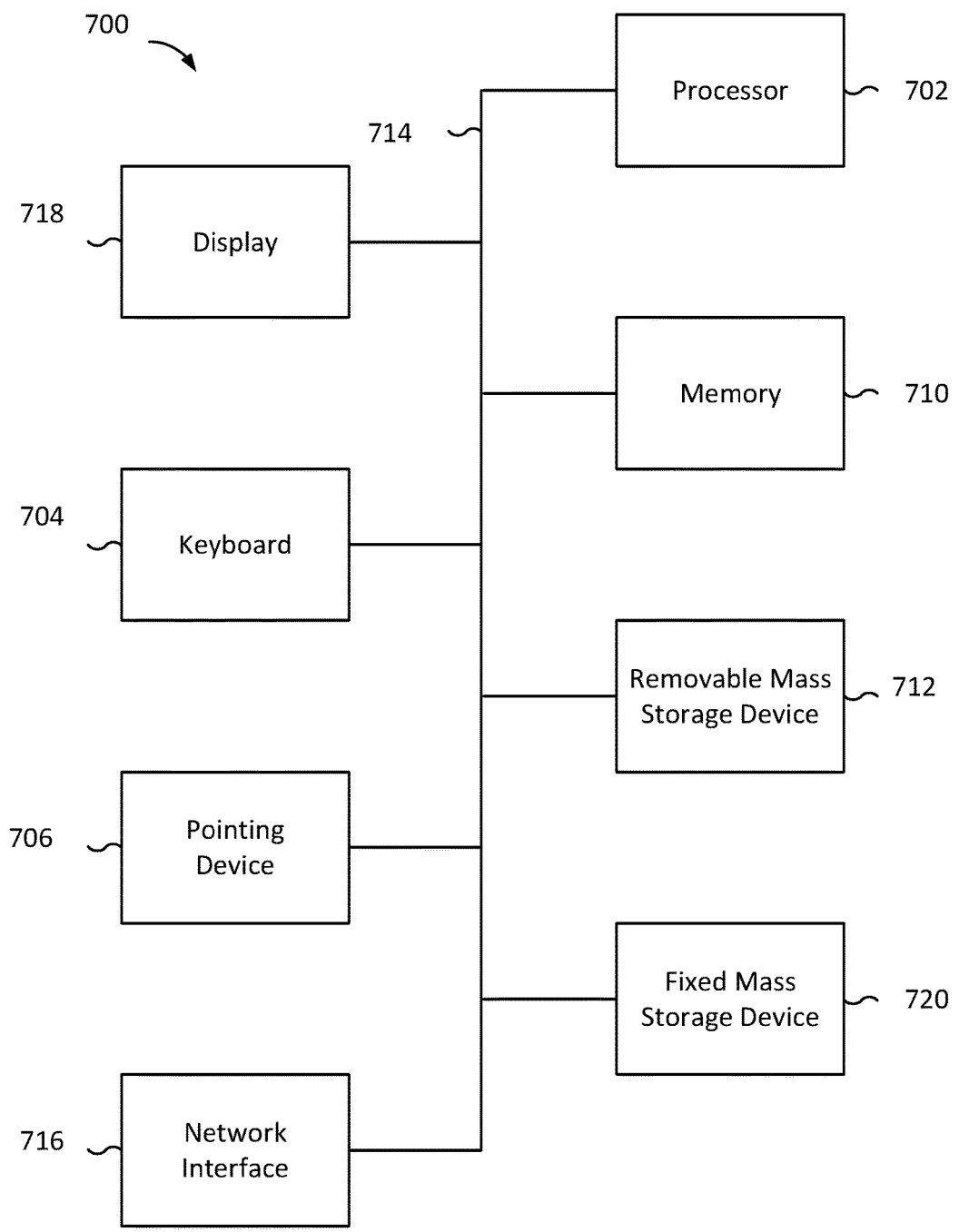
FIG. 7 is a functional diagram of a computer system for registering an identity according to various embodiments of the present application.

FIG. 7 is a functional diagram of a computer system for registering an identity according to various embodiments of the present application.

Referring to FIG. 7, a computer system 700 for registering an identity is provided. As will be apparent, other computer system architectures and configurations can be used to save handwriting information in connection with identity registration information. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

A person skilled in the art should understand that the embodiments of the present invention can be provided as methods, systems or computer software products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems), and computer program products of the present invention. Please note that each flow chart and/or block diagram within the flowcharts and/or block diagrams and combinations of flow charts and/or block diagrams within the flowcharts and/or block diagrams can be realized by computer commands. These computer program commands can be provided to a general purpose computer, a special purpose computer, an embedded processor, or the processor of other programmable data processing equipment so as to give rise to a machine, so that the commands executed using the computer or the processor of programmable data processing equipment give rise to a device used to realize the functions designated in one or more processes in a flowchart and/or one or more blocks in a block diagram.

These computer program commands can also be stored in computer-readable memory that guides the computer or other programmable data processing equipment to operate in a specified manner, so that the commands stored in this computer-readable memory give rise to a product that includes the command device, and this command device realizes the functions designated in one or more processes in a flowchart and/or one or more of blocks in a block diagram.

These computer program commands can also be loaded onto a computer or other programmable data processing equipment, with the result that a series of operating steps is executed on a computer or other programmable equipment so as to give rise to computer processing. In this way, the commands executed on a computer or other programmable equipment provide steps for realizing the functions designated by one or more processes in a flow chart and/or one or more blocks in a block diagram In one typical configuration, the computer equipment comprises one or more processors (CPUs), an input/output interface, a network interface, and internal memory.

Internal memory may comprise such forms as volatile memory in computer-readable media, random access memory (RAM), and/or non-volatile memory, such as read-only memory (ROM) or flash memory (flash RAM). Internal memory is an illustrative example of computer-readable media.

Computer-readable media, including permanent and non-permanent and removable and non-removable media, may achieve information storage by any method or technology. Information can be computer-readable commands, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other internal memory technology, read-only disk read-only memory (CD-ROM), digital versatile disk (DVD), or other optical storage, magnetic cassette tape, magnetic disk storage, or other magnetic storage equipment, or any other non-transmission media that can be used to store information that can be used to store information that can be accessed by computer equipment. According to the definitions in this document, computer-readable media does not include transitory computer-readable media (transitory media), such as modulated data signals and carrier waves.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or equipment that comprises said elements.

A person skilled in the art should understand that the embodiment of the present application can be provided as methods, systems, or computer program products. Therefore, the present application may take the form of complete hardware embodiments, complete software embodiments, or embodiments that combine software and hardware. Moreover, the present application may take the form of computer program products implemented on one or more computer-operable storage media (including but not limited to magnetic disk storage, CD-ROMs, and optical storage) containing computer-operable program code.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors, first handwriting information associated with handwriting entered by a user;
    in response to obtaining the first handwriting information, processing the first handwriting information, the processing of the first handwriting information, comprising performing a dimension normalization to reduce the effect of wobbling inherent in the writing entered by the user;
    determining, by one or more processors, whether to associate the first handwriting information with an account corresponding to the user, comprising:
        computing, by one or more processors, a degree of complexity of the first handwriting information; and
        determining, by one or more processors, whether the degree of complexity of the first handwriting information satisfies one or more preset conditions, wherein the one or more preset conditions include one or more of a threshold associated with a size of the handwriting, a threshold associated with a length of the handwriting, a threshold associated with a number of strokes, and a threshold associated with a number of inflection points;
    in response to determining that the degree of complexity of the first handwriting information satisfies one or more preset conditions, associating, by the one or more processors, the first handwriting information with identity registration information corresponding to the user;
    obtaining, by one or more processors, a second handwriting information associated with a second handwriting entered by the user;
    comparing, by one or more processors, the second handwriting information with the first handwriting information;
    determining, by one or more processors, whether the second handwriting information matches the first handwriting information based at least in part on a result of the comparing of the second handwriting information; and authenticating, by one or more processors, the user based at least in part on whether the second handwriting information matches the first handwriting information.

2. The method of claim 1, wherein the associating of the first handwriting information with identity registration information corresponding to the user comprises storing the first handwriting information as at least a portion of the identity registration information corresponding to the user.

3. The method of claim 1, wherein the receiving of the first handwriting information input by the user comprises:
providing a set of one or more standard characters to the user, wherein a degree of complexity associated with the set of one or more standard characters satisfies the one or more preset conditions,
wherein the first handwriting information input by the user is based on the set of one or more standard characters provided to the user.

4. The method of claim 1, wherein the computing of the degree of complexity of the first handwriting information comprises:
performing dimension normalization on the first handwriting information to obtain handwriting to be analyzed; and
extracting one or more characteristic values of the handwriting to be analyzed;
wherein the degree of complexity of the first handwriting information is determined based at least in part on the one or more characteristic values.

5. The method of claim 4, wherein the one or more characteristic values comprise at least one of: a maximum length of the handwriting, a minimum length of the handwriting, a number of strokes in the handwriting, a maximum number of handwriting inflection points, a minimum number of handwriting inflection points, a handwriting inflection point weight, a spatial distribution of the handwriting, a gradient distribution of the handwriting, or an area of the handwriting.

6. The method of claim 4, wherein the computing of the degree of complexity of the first handwriting information based at least in part on the characteristic values comprises:
determining a first product for each of the one or more characteristic values and a corresponding first weight;
determining a second product for each of the one or more characteristic values and a corresponding second weight;
obtaining a first degree of complexity value corresponding to the first handwriting information based at least in part on a sum of each of the first products; and
obtaining a second degree of complexity value corresponding to the first handwriting information based at least in part on a sum of each of the second products.

7. The method of claim 6, further comprising:
determining whether the degree of complexity satisfies the one or more preset conditions, wherein in the event that the first degree of complexity value and the second degree of complexity value fall within a preset range, then the degree of complexity of the first handwriting information is determined to satisfy the one or more preset conditions.

8. The method of claim 1, wherein the receiving of the first handwriting information comprises providing a standard character to the user, and the first handwriting information input by the user is based at least in part on the standard character, and wherein the standard character is selected according to attribute information corresponding to the user.

9. The method of claim 8, wherein the attribute information corresponding to the user comprises one or more of: a geographic location corresponding to the user, a keyword included in historical information corresponding to the user, or content followed by the user.

10. The method of claim 1, wherein the second handwriting information is received and compared with the first handwriting information in connection with a request to access a data domain, and in the event that the second handwriting information matches the first handwriting information, the user is granted access to the data domain.

11. The method of claim 1, wherein the determining of whether the second handwriting information matches the first handwriting information is based at least on part on a degree of similarity between the second handwriting information and the first handwriting information.

12. The method of claim 1, wherein the computing of the degree of complexity of the first handwriting information comprises computing a degree of complexity value based on a weighted representation of a plurality of characteristics of the first handwriting information.

13. The method of claim 1, further comprising:
determining, by one or more processors, the first handwriting information that the user is to be prompted to input, wherein the first handwriting information is determined based at least in part on historical information associated with the user; and
prompting, by one or more users, the user to input the first handwriting information,
wherein the user enters the handwriting in response to the prompting of the user to input the first handwriting information.

14. The method of claim 13, wherein the historical information comprises a set of search keywords commonly used by the user.

15. The method of claim 13, wherein the historical information comprises a set of words associated with content followed by the user.

16. A device, comprising:
at least one processor configured to:
obtain a first handwriting information associated with handwriting entered by a user;
in response the first handwriting information being obtained, process the first handwriting information, the processing of the first handwriting information, comprising performing a dimension normalization to reduce the effect of wobbling inherent in the writing entered by the user;
determine whether to associate the first handwriting information with an account corresponding to the user, comprising:
compute a degree of complexity of the first handwriting information; and
determine whether the degree of complexity of the first handwriting information satisfies one or more preset conditions, wherein the one or more preset conditions include one or more of a threshold associated with a size of the handwriting, a threshold associated with a length of the handwriting, a threshold associated with a number of strokes, and a threshold associated with a number of inflection points;
in response to determining that the degree of complexity of the first handwriting information satisfies one or more preset conditions, associate the first handwriting information with identity registration information corresponding to the user;

obtain a second handwriting information associated with a second handwriting entered by the user;

compare the second handwriting information with the first handwriting information;

determine whether the second handwriting information matches the first handwriting information based at least in part on a result of the comparison of the second handwriting information;

authenticate the user based at least in part on whether the second handwriting information matches the first handwriting information; and a memory coupled to the at least one processor and configured to provide the at least one processor with instructions.

17. The device of claim 16, wherein the at least one processor is configured to associate the first handwriting information with identity registration information corresponding to the user by storing the first handwriting information as at least a portion of the identity registration information corresponding to the user.

18. The device of claim 16, wherein the at least one processor is configured to provide a set of one or more standard characters to the user, a degree of complexity associated with the set of one or more standard characters satisfies the one or more preset conditions, and wherein the first handwriting information input by the user is based on the set of one or more standard characters provided to the user.

19. The device of claim 16, wherein the at least one processor is configured to:

perform dimension normalization on the first handwriting information to obtain handwriting to be analyzed; and extract one or more characteristic values of the handwriting to be analyzed;

wherein the degree of complexity of the first handwriting information is determined based at least in part on the characteristic values.

20. The device of claim 19, wherein the one or more characteristic values comprise at least one of: a maximum length of the handwriting, a minimum length of the handwriting, a number of strokes in the handwriting, a maximum number of handwriting inflection points, a minimum number of handwriting inflection points, a handwriting inflection point weight, a spatial distribution of the handwriting, a gradient distribution of the handwriting, or an area of the handwriting.

21. The device of claim 19, wherein the at least one processor is configured to:

determine a first product for each of the one or more characteristic values and a corresponding first weight;

determine a second product for each of the one or more characteristic values and a corresponding second weight;

obtain a first degree of complexity value corresponding to the first handwriting information based at least in part on a sum of each of the first products; and obtain a second degree of complexity value corresponding to the first handwriting information based at least in part on a sum of each of the second products.

22. The device of claim 21, wherein the at least one processor is configured to determine whether the degree of complexity satisfies the one or more preset conditions, wherein in the event that the first degree of complexity value and the second degree of complexity value fall within a preset range, then the degree of complexity of the first handwriting information is determined to satisfy the one or more preset conditions.

23. The device of claim 16, wherein the at least one processor is configured to provide a standard character to the user, and the first handwriting information input by the user is based at least in part on the standard character, and wherein the standard character is selected according to attribute information corresponding to the user.

24. The device of claim 23, wherein the attribute information corresponding to the user comprises one or more of: a geographic location corresponding to the user, a keyword included in historical information corresponding to the user, or content followed by the user.

25. The device of claim 16, wherein the second handwriting information is received and compared with the first handwriting information in connection with a request to access a data domain, and in the event that the second handwriting information matches the first handwriting information, the user is granted access to the data domain.

26. A computer program product, the computer program product being embodied in a non-transitory computer readable storage medium and comprising computer instructions for:

obtaining, by one or more processors, first handwriting information associated with handwriting entered by a user;

in response to obtaining the first handwriting information, processing the first handwriting information, the processing of the first handwriting information, comprising performing a dimension normalization to reduce the effect of wobbling inherent in the writing entered by the user;

determining, by one or more processors, whether to associate the first handwriting information with an account corresponding to the user, comprising:

computing, by one or more processors, a degree of complexity of the first handwriting information; and determining, by one or more processors, whether the degree of complexity of the first handwriting information satisfies one or more preset conditions, wherein the one or more preset conditions include one or more of a threshold associated with a size of the handwriting, a threshold associated with a length of the handwriting, a threshold associated with a number of strokes, and a threshold associated with a number of inflection points;

in response to determining that the degree of complexity of the first handwriting information satisfies one or more preset conditions, associating, by the one or more processors, the first handwriting information with identity registration information corresponding to the user;

obtaining, by one or more processors, a second handwriting information associated with a second handwriting entered by the user;

comparing, by one or more processors, the second handwriting information with the first handwriting information;

determining, by one or more processors, whether the second handwriting information matches the first handwriting information based at least in part on a result of the comparing of the second handwriting information; and authenticating, by one or more processors, the user based at least in part on whether the second handwriting information matches the first handwriting information.

* * * * *